United States Patent
Nakagawa et al.

(10) Patent No.: US 9,505,081 B2
(45) Date of Patent: Nov. 29, 2016

(54) MANUFACTURING METHOD FOR OUTER JOINT MEMBER OF CONSTANT VELOCITY UNIVERSAL JOINT AND OUTER JOINT MEMBER

(71) Applicants: Naoki Nakagawa, Shizuoka (JP); Shintaro Suzuki, Shizuoka (JP); Shigeki Matsushita, Shizuoka (JP)

(72) Inventors: Naoki Nakagawa, Shizuoka (JP); Shintaro Suzuki, Shizuoka (JP); Shigeki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/651,480

(22) PCT Filed: Nov. 22, 2013

(86) PCT No.: PCT/JP2013/081545
§ 371 (c)(1),
(2) Date: Jun. 11, 2015

(87) PCT Pub. No.: WO2014/097821
PCT Pub. Date: Jun. 26, 2014

(65) Prior Publication Data
US 2015/0315668 A1 Nov. 5, 2015

(30) Foreign Application Priority Data
Dec. 19, 2012 (JP) .................. 2012-276908

(51) Int. Cl.
*B23K 15/04* (2006.01)
*B23P 15/00* (2006.01)
(Continued)

(52) U.S. Cl.
CPC ........... *B23K 15/04* (2013.01); *B23K 15/0006* (2013.01); *B23K 15/0046* (2013.01);
(Continued)

(58) Field of Classification Search
CPC ...... F16D 3/202; F16D 3/205; F16D 3/2052; F16D 3/2055; F16D 3/2057; F16D 2003/2026; F16D 2300/22; F16D 3/20; F16D 3/22; F16D 3/223; F16D 3/2233; F16D 3/2237; F16D 3/224; F16D 3/24; F16D 2003/22306; F16D 2003/22309; B23K 15/0006; B23K 15/0046; B23K 15/06; B23K 15/04; B23P 15/00; B23P 2700/11; C21D 1/18; C21D 1/42; C21D 9/50
USPC ........ 464/111, 120–123, 132, 905, 145, 146, 464/904, 906; 403/270–272; 29/428
See application file for complete search history.

(56) References Cited

U.S. PATENT DOCUMENTS 3,217,135 A * 11/1965 Eklund ................. B23K 15/10
219/121.13
5,330,095 A 7/1994 Krude et al.
(Continued)

FOREIGN PATENT DOCUMENTS

JP 8-188857 7/1996
JP 2005-98449 4/2005
(Continued)

OTHER PUBLICATIONS

Translation of JP 2007-263299. Nakagawa, et al. Manufacturing Method of Bearing Device for Wheel. Oct. 11, 2007.*
(Continued)

*Primary Examiner* — Josh Skroupa
(74) *Attorney, Agent, or Firm* — Wenderoth, Lind & Ponack, L.L.P.

(57) ABSTRACT

A manufacturing method for an outer joint member of a constant velocity universal joint includes forming a cup member and a shaft member, forming a joining hole in a thickness of a bottom portion to prepare the cup member as a finished component, and forming a joining outer surface on an end portion of the shaft member to be joined onto the bottom portion of the cup member to prepare the shaft member as a finished component. The method also includes fitting the joining hole of the cup member and the joining outer surface of the shaft member as the finished components to each other, and welding a fitting portion between the joining hole and the joining outer surface through irradiation of a beam from an inner side of the cup member, a diameter of the fitting portion being an equal dimension for each joint size.

14 Claims, 14 Drawing Sheets

(51) Int. Cl.
- *C21D 1/18* (2006.01)
- *C21D 1/42* (2006.01)
- *C21D 9/50* (2006.01)
- *F16D 3/202* (2006.01)
- *F16D 3/223* (2011.01)
- *B23K 15/00* (2006.01)
- *B23K 15/06* (2006.01)
- *C21D 9/40* (2006.01)
- *F16D 3/20* (2006.01)
- *C21D 9/28* (2006.01)

(52) U.S. Cl.
CPC ............... *B23K15/06* (2013.01); *B23P 15/00* (2013.01); *C21D 1/18* (2013.01); *C21D 1/42* (2013.01); *C21D 9/28* (2013.01); *C21D 9/40* (2013.01); *C21D 9/50* (2013.01); *F16D 3/20* (2013.01); *F16D 3/202* (2013.01); *F16D 3/223* (2013.01); *B23P 2700/11* (2013.01); *Y10T 29/49826* (2015.01); *Y10T 403/477* (2015.01)

(56) References Cited

U.S. PATENT DOCUMENTS

| | | | |
|---|---|---|---|
| 2008/0245777 A1* | 10/2008 | Cremerius | B23K 26/08 219/121.64 |
| 2010/0119300 A1 | 5/2010 | Nakagawa et al. | |

FOREIGN PATENT DOCUMENTS

| | | |
|---|---|---|
| JP | 2007-263298 | 10/2007 |
| JP | 2007-263299 | 10/2007 |
| JP | 2008-64195 | 3/2008 |
| JP | 2008-232189 | 10/2008 |
| JP | 2010-47043 | 3/2010 |
| JP | 2011-190903 | 9/2011 |
| JP | 2011-226589 | 11/2011 |
| JP | 2012-57696 | 3/2012 |
| JP | 2012-229714 | 11/2012 |

OTHER PUBLICATIONS

Translation of JP 2008-232189. Iwai, Akinori. Method of Producing Power Transmission Shaft. Oct. 2, 2008.*
Translation of JP 2011-190903. Kondo, et al. Outer Joint Member of Constant Velocity Universal Joint, Constant Velocity Universal Joint, and Joint Assembly. Sep. 29, 2011.*
Translation of JP 2011-226589. Morimoto, Hiroo. Tripod Type Constant Velocity Universal Joint and Outside Joint Member for the Same. Nov. 10, 2011.*
Translation of JP 2012-229714. Inoue, Masaya. Method of Manufacturing Outside Joint Member for Constant Velocity Universal Joint and Outside Joint Member for Constant Velocity Universal Joint. Nov. 22, 2012.*
English translation of the International Preliminary Report on Patentability (Chapter I), issued Jun. 23, 2015, for Application No. PCT/JP2013/081545.
International Search Report issued Jan. 7, 2014 in International (PCT) Application No. PCT/JP2013/081545.
Extended European Search Report issued Aug. 17, 2016 in corresponding European Patent Application No. 13866102.0.

* cited by examiner

MANUFACTURING METHOD FOR OUTER JOINT MEMBER OF CONSTANT VELOCITY UNIVERSAL JOINT AND OUTER JOINT MEMBER

TECHNICAL FIELD

The present invention relates to a manufacturing method for an outer joint member of a constant velocity universal joint, and to an outer joint member.

BACKGROUND ART

In a constant velocity universal joint, which is used to construct a power transmission system for automobiles and various industrial machines, two shafts on a driving side and a driven side are coupled to each other to allow torque transmission therebetween, and rotational torque is transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft for transmitting power from an engine of an automobile to a driving wheel, for example, the plunging type constant velocity universal joint is used on a differential side (inboard side), and the fixed type constant velocity universal joint is used on a driving wheel side (outboard side).

Irrespective of the plunging type and the fixed type, the constant velocity universal joint includes, as a main component, an outer joint member including a cup section having track grooves formed in an inner circumferential surface thereof to engage with torque transmitting elements, and a shaft section that extends from a bottom portion of the cup section in an axial direction. In many cases, the outer joint member is obtained by integrally forming the cup section and the shaft section by subjecting a rod-like solid material (bar material) to plastic working such as forging and ironing or a process such as cutting, heat treatment, and grinding.

Incidentally, as the outer joint member, an outer joint member including a shaft section that is long (long stem) may sometimes be used. In order to equalize lengths of a right part and a left part of the drive shaft, the long stem is used for an outer joint member on the inboard side that corresponds to one side of the drive shaft. The long stem is rotatably supported by a rolling bearing. Although varied depending on vehicle types, the length of the long stem section is approximately from 300 mm to 400 mm in general. In the outer joint member, the shaft section is long, which causes difficulty in integrally forming the cup section and the shaft section with high accuracy. Therefore, there is known an outer joint member in which the cup section and the shaft section are constructed as separate members, and both the members are joined through friction press-contact. Such a friction press-contact technology is disclosed in, for example, JP 2012-57696 A.

An overview of the friction press-contact technology for the outer joint member disclosed in JP 2012-57696 A is described with reference to FIGS. 14 and 15. An intermediate product 71' of an outer joint member 71 includes a cup member 72 and a shaft member 73, which are joined through the friction press-contact. As illustrated in FIG. 14, burrs 75 are generated at inner and outer diameters on a joining portion 74 through the press-contact. In order to mount a rolling bearing (see FIG. 1) to a shaft section of the intermediate product 71' of the outer joint member 71, as illustrated in FIG. 15, it is necessary to remove the burrs 75 on the outer diameter side of the joining portion 74 through a process such as turning. Although not shown, the intermediate product 71' is processed into a finished product of the outer joint member 71 through machining of a spline, snap ring grooves, and the like. Therefore, the outer joint member 71 and the intermediate product 71' have slight differences in shape, but illustration of the slight differences in shape is omitted in FIG. 15 to simplify the description, and the outer joint member 71 as the finished product and the intermediate product 71' are denoted by the same reference symbols at the same parts. The same applies to the description below.

Problems to be Solved by the Invention

The burrs 75 on the joining portion 74 generated through the friction press-contact described above are quenched by friction heat and cooling that follows the friction heat. Thus, the burrs 75 have a high hardness and a distorted shape extended in a radial direction and an axial direction. Therefore, as illustrated in FIG. 15, when removing the burrs 75 on the outer diameter side through the turning, a tip for turning is liable to be significantly abraded due to the high hardness and cracked due to the distorted shape. Therefore, it is difficult to increase turning speed. In addition, a cutting amount per one pass of the tip for turning is decreased, and hence the number of passes is increased, which causes a problem in that a cycle time is increased to increase a manufacturing cost.

Further, in order to inspect a joining state of the joining portion 74 of the outer joint member 71, when ultrasonic flaw detection, which enables flaw detection at high speed, is to be performed, an ultrasonic wave is scattered due to the burrs 75 remaining on the inner diameter side of the joining portion 74, and hence the joining state cannot be confirmed. Therefore, there occurs a problem in that total inspection through the ultrasonic flaw detection cannot be performed after the joining.

In view of the above-mentioned problems, when the components are joined through laser welding or electron beam welding, it is possible to prevent surfaces of the joining portion from being increased in thickness unlike the case of the friction press-contact. However, when the cup member 72 and the shaft member 73 as illustrated in FIG. 16 are brought into abutment against each other to be welded, gas pressure in a hollow cavity portion 76 is increased due to processing heat at the time of welding, and after completion of the welding, the pressure is decreased. Due to the variation in the internal pressure of the hollow cavity portion 76, blowing of a molten material occurs. Thus, a recess is formed on outer diameter surfaces of the welded portion, poor welding in terms of depth occurs, and air bubbles are generated inside the weldings, thereby degrading the welding state. As a result, the strength of the welded portion is not stable, which adversely affects quality.

As a countermeasure, it is conceived to perform welding after evacuating the hollow cavity portion 76 that is formed in a region where the cup member 72 and the shaft member 73 are brought into abutment against each other. As described later, it was proved that there remain problems in terms of technology, cost, and the like.

In addition, the cup member 72 and the shaft member 73, which are joined through the friction press-contact as illustrated in FIGS. 14 and 15 or joined by welding as illustrated in FIG. 16 as described above, are joined at a midway position of the shaft section. Accordingly, as described later, it was proved that there is also a problem in terms of cost reduction achieved through enhancement of productivity and standardization of a product type of the cup member.

SUMMARY OF INVENTION

The present invention has been proposed in view of the above-mentioned problems, and has an object to provide a manufacturing method for an outer joint member and an outer joint member, which are capable of increasing strength of a welded portion and quality, reducing welding cost, achieving cost reduction through enhancement of productivity and standardization of a product type, and reducing a burden of production management.

Solutions to the Problems

In order to achieve the above-mentioned object, inventors of the present invention diligently made research and inspection, and found out the following findings. Based on the many-sided findings, the inventors of the present invention conceived a novel manufacturing concept to make the present invention.

(1) In terms of production technology in laser welding and electron beam welding, in a case where welding is performed after placing the cup member 72 and the shaft member 73 in a sealed space so as to evacuate the sealed space and then evacuating the hollow cavity portion 76, there is a problem in that a time period required to evacuate varies depending on a product size. In particular, in a case where welding is performed on a long shaft member as in an outer joint member of a long stem type, a long time period is required for the evacuation, and hence a cycle time is increased, which leads to increase in cost of a joining step.

(2) Further, in terms of productivity, in a case where welding is performed on the cup member and the shaft member, which are completed after undergoing heat treatment such as quenching and tempering in order to enhance productivity, a temperature of a peripheral portion is increased by heat generated at the time of welding, which causes a problem of reduction in hardness of a region subjected to heat treatment. As a countermeasure, it is conceived to employ a method of cooling the cup member and the shaft member as workpieces by water cooling, air cooling, or the like during welding. However, in a case where this method is applied in the sealed space, it was proved that a degree of vacuum is lowered, and that there remain the above-mentioned problems of instability of strength of a welded portion and an adverse effect on quality.

(3) Still further, in terms of productivity and standardization of a product type, the cup member 72 illustrated in FIG. 14 to FIG. 16 is shaped to include a short shaft section that is formed by forging or the like to have a diameter smaller than that of the bottom portion of the cup section. Further, the cup member 72 and the shaft member 73 are joined at the midway position of the shaft section. Depending on a vehicle to which the shaft member 73 is assembled, the shaft member 73 is required to have a variety of shaft diameters and outer circumferential shapes in addition to differences in types such as a general length stem type and a long stem type. Therefore, there are also variations both in a shaft diameter (joining diameter) and a shape, and in a length (joining position) of the short shaft section of the cup member 72 to be joined to the shaft member 73, thereby requiring the cup member 72 dedicated to one type of the shaft member 73. Therefore, it was proved that there is a problem in terms of cost reduction achieved through enhancement of productivity and standardization of a product type of the cup member.

As a technical measure to achieve the above-mentioned object, according to one embodiment of the present invention, there is provided a manufacturing method for an outer joint member of a constant velocity universal joint, which is obtained by constructing, through use of separate members, a cup section having track grooves, which engage with torque transmitting elements, formed in an inner circumference thereof, and a shaft section that is formed on a bottom portion of the cup section, and by welding a cup member forming the cup section and a shaft member forming the shaft section, the manufacturing method comprising: forming the cup member and the shaft member of medium carbon steel; performing, as manufacturing steps, a machining step and a heat treatment step on the cup member after integrally forming a tubular portion and the bottom portion of the cup member by forging, the machining step comprising forming a joining hole in a thickness direction of the bottom portion to prepare the cup member as a finished component; performing, as manufacturing steps, a machining step and a heat treatment step on the shaft member, the machining step for the shaft member comprising forming a joining outer surface on an end portion of the shaft member to be joined onto the bottom portion of the cup member to prepare the shaft member as a finished component; fitting the joining hole of the cup member as the finished component and the joining outer surface of the shaft member as the finished component to each other; and welding a fitting portion between the joining hole and the joining outer surface through irradiation of a beam from an inner side of the cup member, a diameter of the fitting portion being set to an equal dimension for each joint size.

Further, as an outer joint member of a constant velocity universal joint according to one embodiment of the present invention, there is provided an outer joint member comprising: a cup section having track grooves, which engage with torque transmitting elements, formed in an inner circumference thereof; and a shaft section formed on a bottom portion of the cup section, the outer joint member being obtained by constructing the cup section and the shaft section through use of separate members, and by welding a cup member forming the cup section and a shaft member forming the shaft section, wherein the cup member and the shaft member are formed of medium carbon steel, wherein the cup member has a tubular portion and the bottom portion integrally formed by forging, and a joining hole formed in a thickness of the bottom portion, wherein the shaft member has a joining outer surface formed on an end portion thereof to be joined onto the bottom portion, wherein the joining outer surface is fitted into the joining hole so that the cup member and the shaft member are welded, wherein a welded portion between the cup member and the shaft member is formed of a weld bead formed through irradiation from an inner side of the cup member, and wherein a diameter of a fitting portion between the joining hole and the joining outer surface is set to an equal dimension for each joint size.

In this case, in the present invention, setting the diameter of the fitting portion between the joining hole and the joining outer surface to an equal dimension for each joint size is not limited to preparing one type of the cup member for one joint size, that is, not limited to preparing the cup member assigned with a single product number. For example, the present invention encompasses preparing cup members of a plurality of types (assigned with a plurality of product numbers, respectively) for one joint size based on different specifications of a maximum operating angle, and setting the diameter of the fitting portion of each of the cup members to an equal dimension. Further, setting the diameter of the fitting portion between the joining hole and the joining outer surface to an equal dimension for each joint size encompasses a case where types of the constant velocity universal joints are different. For example, the present invention encompasses setting the diameter of the fitting portion of each of a tripod type constant velocity universal joint and a double offset type constant velocity universal joint on the inboard side, and also encompasses setting the diameter of the fitting portion of each of a Rzeppa type constant velocity universal joint and an undercut free type constant velocity universal joint on the outboard side. In addition, the diameter of the fitting portion of each of the constant velocity universal joints on the inboard side and the outboard side can be equalized.

With the above-mentioned configuration, it is possible to realize the manufacturing method for an outer joint member and the outer joint member, which are capable of increasing the strength of the welded portion and the quality, reducing the welding cost, achieving the cost reduction through the enhancement of productivity of the cup member and the shaft member and through the standardization of a product type of the cup member, and alleviating the burden of production management.

Specifically, it is desired that, before the welding, at least one of the cup member and the shaft member be subjected to finishing, such as grinding after heat treatment or cutting work after quenching, as the finished components. With this, it is possible to obtain the cup member prepared as the finished component for common use for each joint size, and the shaft member having a variety of specifications of the shaft section for each vehicle type. Thus, the cup member and the shaft member are each assigned with a product number for management. Therefore, the cost is significantly reduced through the standardization of a product type of the cup member, and the burden of production management is significantly alleviated. Further, the cup member prepared for common use and the shaft member having a variety of specifications of the shaft section can be manufactured separately until the cup member and the shaft member are formed into the finished components subjected to finishing such as cutting work after forging, turning, heat treatment, grinding, and quenching. Further, as well as reduction of setups and the like, the enhancement of productivity is achieved. However, in the present invention, the cup member and the shaft member as the finished components are not limited to members subjected to finishing (finishing of, for example, a bearing mounting surface and a sliding bearing surface) such as the grinding after the heat treatment or the cutting work after the quenching as described above. The cup member and the shaft member according to the present invention encompass members assuming a state after completion of heat treatment but before undergoing the finishing.

The above-mentioned welding comprises electron beam welding. Thus, burrs are not generated on the joining portion. Reduction of manufacturing cost through omission of the number of post processes for the joining portion can be reliably realized, and further, total inspection on the joining portion through ultrasonic flaw detection can be reliably performed. Further, deep penetration can be obtained by electron beam welding, thereby being capable of increasing welding strength and reducing thermal strain.

It is desired that the welding be performed under a state in which pressure of an interior of the cup section is equal to or lower than atmospheric pressure. The internal space of the cup member is evacuated, thereby reducing a space to be evacuated. Accordingly, it is possible to reduce a cycle time, and to reduce a difference in the time period required for the evacuation depending on the product sizes. As a result, without increasing a cycle time, the manufacturing method is compatible with a different model number or product type. Further, in terms of the quality, the internal space of the cup member is evacuated, thereby being capable of increasing the quality of the welded portion.

It is desired that the welding be performed while cooling the cup section and the shaft section. With this, even in a case where the welding is performed on the cup member and the shaft member as the finished components subjected to heat treatment such as quenching and tempering, such a problem is solved that a temperature of a peripheral portion is increased by heat at the time of the welding to cause reduction in hardness of a region subjected to heat treatment. Further, regions of the cup section and the shaft section to be cooled are separated from the internal space of the cup member to be evacuated, thereby solving the problem in that the degree of vacuum is lowered to cause the instability of the strength of the welded portion and the adverse effect on the quality.

It is desired that the manufacturing method further comprise pre-heating a joining region between the cup member and the shaft member to from 200° C. to 650° C. before the welding, or post-heating the joining region between the cup member and the shaft member to from 200° C. to 650° C. after the welding. With this, cooling speed after the welding is reduced, thereby being capable of preventing a quenching crack. Consequently, it is possible to adjust hardness of the welded region, and to obtain an excellent welded state.

It is desired that hardness of a welded portion between the cup member and the shaft member range from Hv 200 to Hv 500. When the hardness is lower than Hv 200, it is difficult to secure the strength required in terms of a product function, which is undesirable. On the other hand, when the hardness exceeds Hv 500, a crack may occur, which is undesirable.

Effects of the Invention

According to the manufacturing method for an outer joint member of a constant velocity universal joint and the outer joint member of the one embodiment of the present invention, it is possible to realize the manufacturing method for an outer joint member and the outer joint member, which are capable of increasing the strength of the welded portion and the quality, reducing the welding cost, achieving the cost reduction through the enhancement of the productivity of the cup member and the shaft member and through the standardization of a product type of the cup member, and alleviating the burden of production management.

BRIEF DESCRIPTION OF DRAWINGS

FIG. 2c is an enlarged view for illustrating a circle "A" of FIG. 2a.

EMBODIMENTS OF THE INVENTION

Now, description is made of embodiments of the present invention with reference to the drawings.

FIG. 3 to FIG. 11 are views for illustrating a manufacturing method for an outer joint member of a constant velocity universal joint according to an embodiment of the present invention, and FIGS. 1, 2a, 2b, and 2c are views for illustrating an outer joint member according to a first embodiment of the present invention. First, the outer joint member according to the first embodiment is described with reference to FIGS. 1, 2a, 2b, and 2c, and subsequently, the manufacturing method for an outer joint member according to the embodiment is described with reference to FIG. 3 to FIG. 11.

Figure 1:
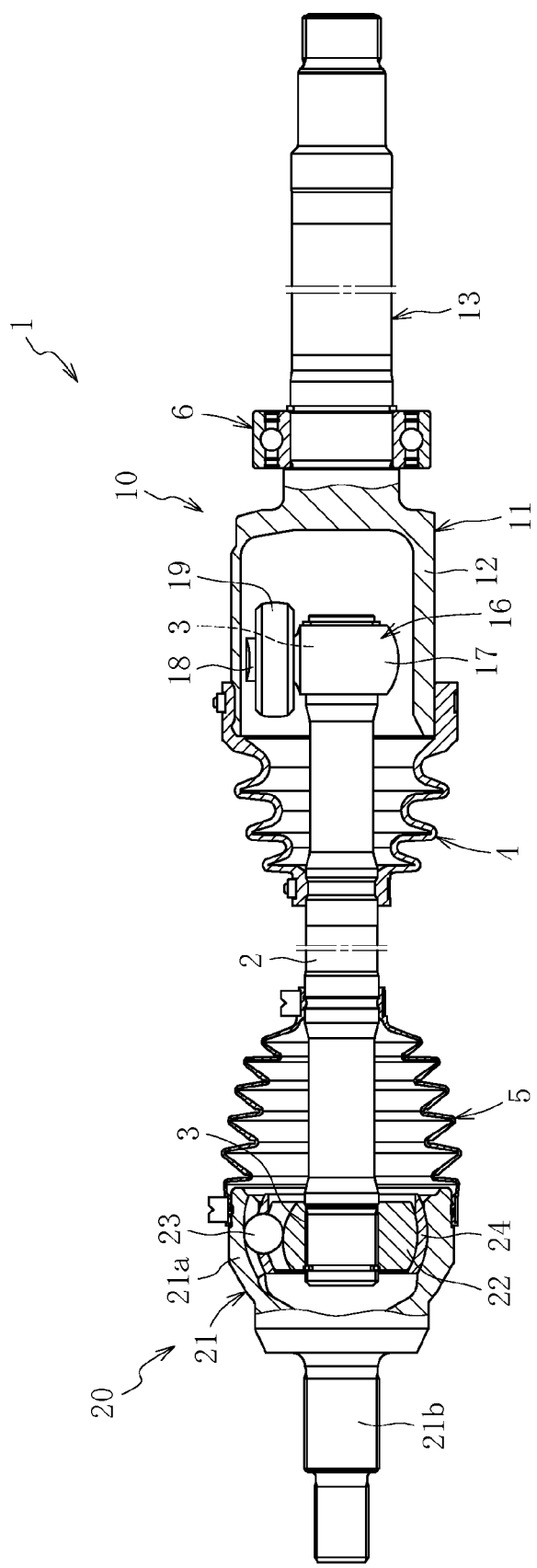
FIG. 1 is a view for illustrating the entire structure of a drive shaft to which an outer joint member according to a first embodiment of the present invention is applied.

FIG. 1 is a view for illustrating the entire structure of a drive shaft 1 using an outer joint member 11 according to the first embodiment. The drive shaft 1 comprises, as main components, a plunging type constant velocity universal joint 10 arranged on a differential side (right side of FIG. 1: hereinafter also referred to as inboard side), a fixed type constant velocity universal joint 20 arranged on a driving wheel side (left side of FIG. 1: hereinafter also referred to as outboard side), and an intermediate shaft 2 that couples both the constant velocity universal joints 10 and 20 to allow torque transmission therebetween.

The plunging type constant velocity universal joint 10 illustrated in FIG. 1 is a so-called tripod type constant velocity universal joint (TJ), and comprises the outer joint member 11 comprising a cup section 12 and a long shaft section (long stem section) 13 that extends from a bottom portion of the cup section 12 in an axial direction, an inner joint member 16 housed along an inner circumference of the cup section 12 of the outer joint member 11, and rollers 19 serving as torque transmitting elements that are arranged between the outer joint member 11 and the inner joint member 16. The inner joint member 16 comprises a tripod member 17 comprising three equiangularly-formed leg shafts 18 on which the rollers 19 are externally fitted.

An inner race of a support bearing 6 is fixed to an outer circumferential surface of the long stem section 13, and an outer race of the support bearing 6 is fixed to a transmission case with a bracket (not shown). The outer joint member 11 is supported by the support bearing 6 in a freely rotatable manner, and when the support bearing 6 as described above is provided, vibration of the outer joint member 11 at the time of driving or the like is prevented as much as possible.

The fixed type constant velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner circumference of the cup section 21a of the outer joint member 21, balls 23 serving as torque transmitting elements that are arranged between the cup section 21a of the outer joint member 21 and the inner joint member 22, and a cage 24 arranged between an inner circumferential surface of the cup section 21a of the outer joint member 21 and an outer circumferential surface of the inner joint member 22, for holding the balls 23. Note that, as the fixed type constant velocity universal joint 20, an undercut free type constant velocity universal joint may sometimes be used.

The intermediate shaft 2 comprises splines for transmitting torque (including serrations; the same applies hereinafter) 3 at outer diameters on both end portions thereof. The spline 3 on the inboard side is spline-fitted to a hole portion of the tripod member 17 of the plunging type constant velocity universal joint 10. Thus, the intermediate shaft 2 and the tripod member 17 of the plunging type constant velocity universal joint 10 are coupled to each other to allow torque transmission therebetween. Further, the spline 3 on the outboard side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entrance of a foreign matter from the outside, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

Figure 2C:
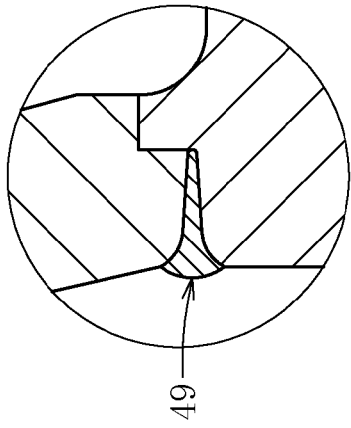
Figure 2A:
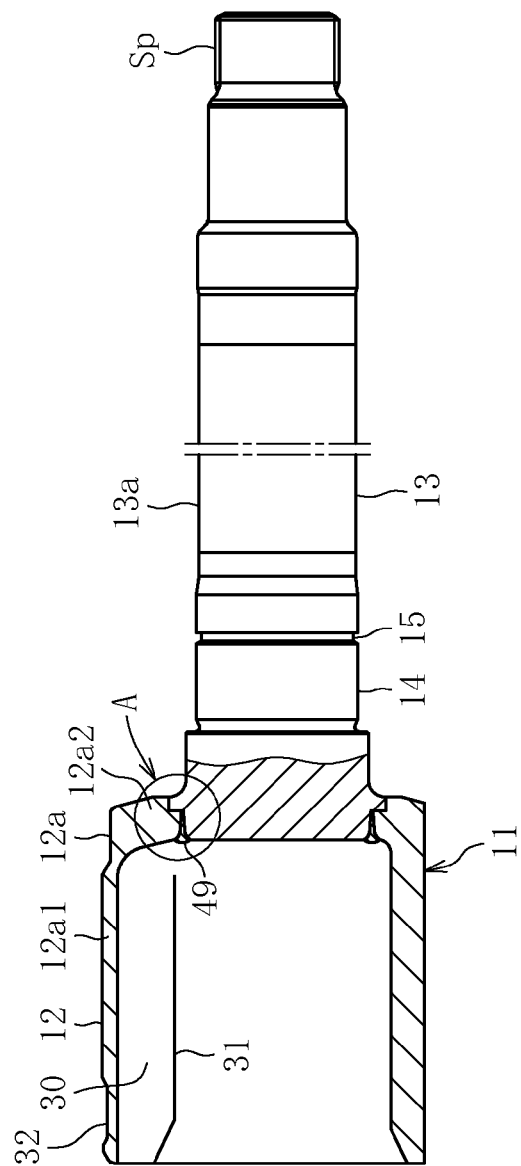
FIG. 2a is an enlarged partial vertical sectional view for illustrating the outer joint member.
Figure 2B:
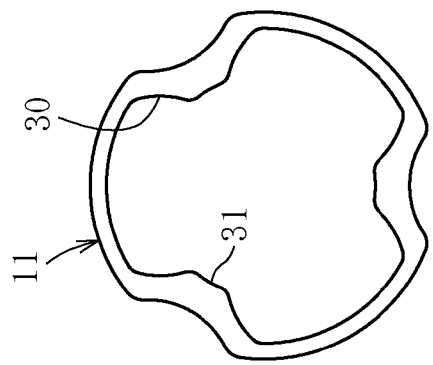
FIG. 2b is a left-hand side view for illustrating the outer joint member.

The outer joint member according to the first embodiment is described with reference to FIGS. 2a, 2b, and 2c. FIG. 2a is an enlarged partial vertical sectional view for illustrating the outer joint member 11 according to this embodiment. FIG. 2b is a left-hand side view. FIG. 2c is an enlarged view for illustrating a circle "A" of FIG. 2a. The outer joint member 11 comprises the bottomed cylindrical cup section 12 that is opened at one end and has an inner circumferential surface 31 and track grooves 30, on which the rollers 19 (see FIG. 1) roll, formed at three equiangular positions of the inner circumferential surface, and the long stem section 13 that extends from the bottom portion of the cup section 12 in the axial direction and comprises a spline Sp serving as a torque transmitting coupling portion formed at an outer circumference on an end portion thereof on the side opposite to the opening side of the cup section 12 (inboard side). In this embodiment, the outer joint member 11 is formed by welding a cup member 12a and a shaft member 13a to each other.

As illustrated in FIGS. 2a and 2c, the cup member 12a is formed of an integrally-formed article having a tubular portion 12a1 and a bottom portion 12a2. The tubular portion 12a1 has the inner circumferential surface 31 and the track grooves 30 formed in an inner circumference thereof. A bearing mounting surface 14 and a snap ring groove 15 are formed in an outer circumference of the shaft member 13a on the cup member 12a side, and the spline Sp is formed in an end portion of the shaft member 13a on the inboard side. A joining outer surface 51 of the shaft member 13a at an end portion thereof on the outboard side is fitted into a joining hole 50 of the bottom portion 12a2 of the cup member 12a (see FIG. 6), and a fitting portion 60 between the joining hole 50 and the joining outer surface 51 is welded by electron beam welding. As illustrated in FIGS. 2a and 2c, a welded portion 49 is formed of a weld bead irradiated from an inner side of the cup member 12a. Although detailed description is made later, a diameter of the fitting portion 60 between the joining hole 50 and the joining outer surface 51 is set to an equal dimension for each joint size. The welded portion 49 is formed on the end portion of the shaft member 13a, and hence a post process for the bearing mounting surface 14 or the like can be omitted. Further, electron beam welding is performed, and hence burrs are not generated on the welded portion. Thus, a post process for the welded portion can be also omitted, which can reduce manufacturing cost. In addition, total inspection on the welded portion through ultrasonic flaw detection can be reliably performed.

Figure 3:
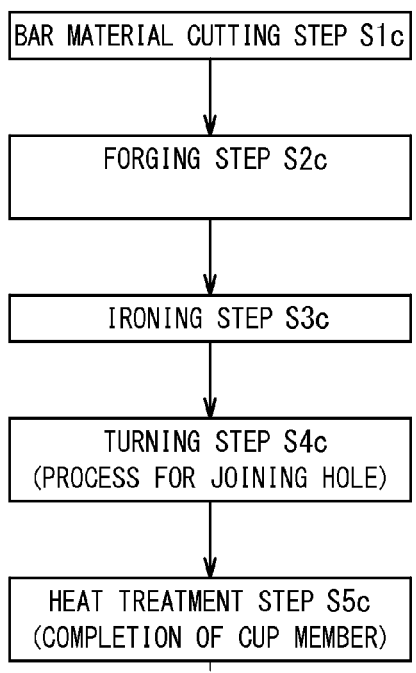
FIG. 3 is a diagram for illustrating an overview of manufacturing steps for the outer joint member.
Figure 3:
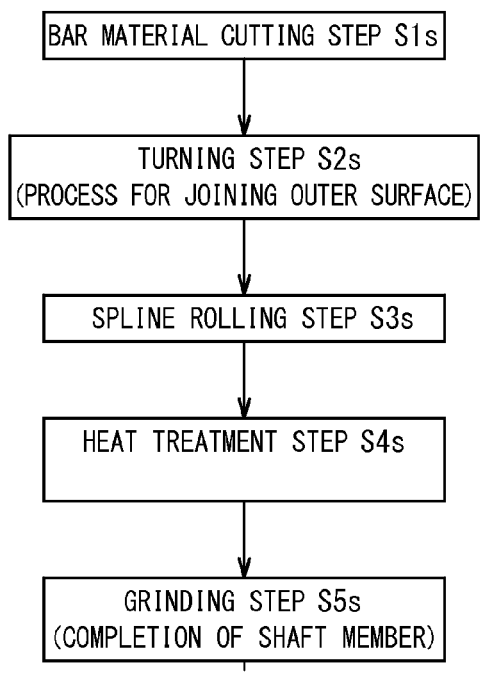
Figure 3:
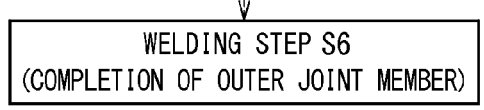

Next, a manufacturing method according to the embodiment of the present invention is described with reference to FIG. 3 to FIG. 11. FIG. 3 is a diagram for illustrating an overview of manufacturing steps for the outer joint member. As illustrated in FIG. 3, the cup member 12a is subjected to a bar material cutting step S1c, a forging step S2c, an ironing step S3c, a turning step S4c, and a heat treatment step S5c as main manufacturing steps so as to be formed into a finished component. On the other hand, the shaft member 13a is subjected to a bar material cutting step S1s, a turning step S2s, a spline rolling step S3s, a heat treatment step S4s, and a grinding step S5s as main manufacturing steps so as to be formed into a finished component. The cup member 12a and the shaft member 13a as the finished components are each assigned with a product number for management. After that, the cup member 12a and the shaft member 13a are subjected to a welding step S6. Thus, the outer joint member 11 is completed. A machining step refers to, among the above-mentioned manufacturing steps, the turning step S4c, the turning step S2s, and the grinding step S5s.

An overview of each step is described. Each step is described as a typical example, and appropriate modification and addition can be made to each step as needed. First, the manufacturing steps for the cup member 12a are described.

[Bar Material Cutting Step S1c]
A bar material is cut into a predetermined length in accordance with a forging weight, thereby producing a billet.

[Forging Step S2c]
The billet is subjected to forging so as to integrally form the tubular portion 12a1 and the bottom portion 12a2 of the cup member 12a. Thus, a preform is produced.

[Ironing Step S3c]
Ironing is performed on the track grooves 30 and the inner circumferential surface 31 of the preform, thereby finishing the inner circumference of the tubular portion 12a1 of the cup member 12a.

[Turning Step S4c]
Turning is performed on an outer circumferential surface, a boot mounting groove 32, and the like of the preform subjected to ironing, and the joining hole 50 (see FIG. 4) is formed in a thickness of the bottom portion 12a2 by the turning.

[Heat Treatment Step S5c]
After the turning, quenching and tempering are performed as heat treatment on at least the track grooves 30 of the cup member 12a. Thus, the cup member 12a is finished into a finished component, and is assigned with a product number for management.

Next, the manufacturing steps for the shaft member 13a are described.

[Bar Material Cutting Step S1s]
A bar material is cut into a predetermined length in accordance with an entire length of a shaft section, thereby producing a billet.

[Turning Step S2s]
Turning is performed on an outer circumferential surface of the billet (the bearing mounting surface 14, the snap ring groove 15, a lower diameter of the spline, an end surface, and the like) and on the joining outer surface 51 (see FIG. 5) of the billet at an end portion thereof on the outboard side.

[Spline Rolling Step S3s]
The spline is formed by rolling in an intermediate product of the shaft member subjected to the turning. Note that, a method of processing the spline is not limited to rolling, and press working or the like can be adopted instead as appropriate.

[Heat Treatment Step S4s]
Induction quenching and tempering are performed as heat treatment on a necessary range of the outer circumference of the shaft member. Heat treatment is not performed on the joining outer surface at an end of the shaft member.

[Grinding Step S5s]
After the heat treatment, the bearing mounting surface 14 and the like of the shaft member 13a are finished by grinding. Thus, the shaft member 13a is finished into a finished component, and is assigned with a product number for management.

[Welding Step S6]
The cup member 12a and the shaft member 13a as the finished components are fitted and welded to each other. Thus, the outer joint member 11 is completed.

Figure 4:
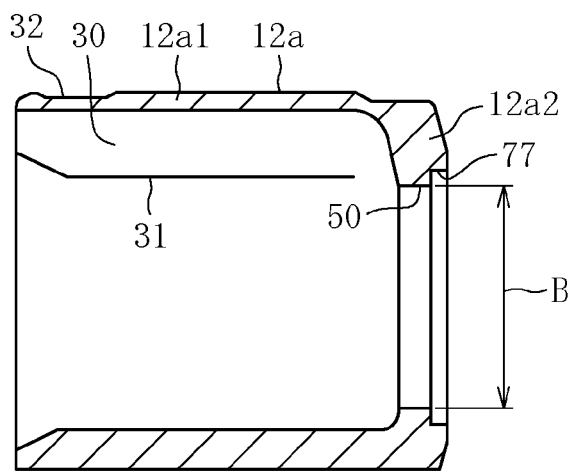
FIG. 4 is a vertical sectional view for illustrating a cup member before welding.

Next, features of the manufacturing method according to this embodiment is described in detail. FIG. 4 is a vertical sectional view for illustrating a state of the cup member 12a as the finished component before welding. The cup member 12a has the tubular portion 12a1 having the track grooves 30 and the inner circumferential surface 31 formed in the inner circumference thereof, and the bottom portion 12a2 extending radially inward from the end portion of the tubular portion 12a1 on the inboard side. The joining hole 50 is formed in the thickness of the bottom portion 12a2. The cup member 12a is formed by medium carbon steel, such as S53C, containing carbon of from 0.40 wt % to 0.60 wt %. In the above-mentioned turning step S4c, the joining hole 50 is formed by cutting work. Although not shown, a hardened layer having hardness of approximately from 58 HRC to 62 HRC is formed on the track grooves 30 and other predetermined portions.

Figure 5:
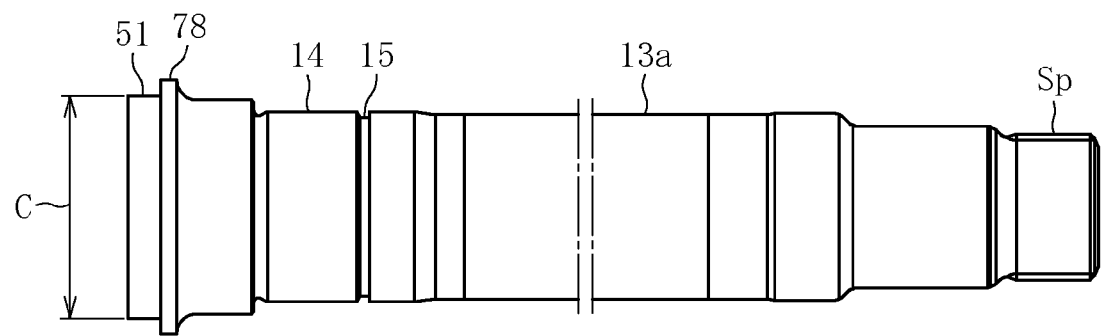
FIG. 5 is a front view for illustrating a shaft member before welding.

FIG. 5 is a view for illustrating a state of the shaft member 13a as the finished component before welding. At the end portion of the shaft member 13a on the outboard side, the joining outer surface 51 to be fitted into the joining hole 50 of the cup member 12a is formed. The bearing mounting surface 14 and the snap ring groove 15 are formed at a position adjacent to the joining outer surface 51, and the spline Sp is formed in the end portion of the shaft member 13a on the inboard side. The shaft member 13a is formed by medium carbon steel, such as S40C, containing carbon of from 0.30 wt % to 0.55 wt %. Although not shown, a hardened layer having hardness of approximately from 50 HRC to 62 HRC is formed in a predetermined range of the outer circumferential surface of the shaft member 13a by induction hardening performed as heat treatment. Heat treatment is not performed on the joining outer surface 51. After the heat treatment step S4s, the bearing mounting surface 14 is finished by the grinding or the like.

A diameter B of the joining hole 50 of the bottom portion 12a2 of the cup member 12a illustrated in FIG. 4 is set to an equal dimension for one joint size. The shaft member 13a illustrated in FIG. 5 is used as a long stem shaft, but a diameter C of the joining outer surface 51, which is formed at the end portion of the shaft member 13a on the outboard side and fitted into the joining hole 50, is set to such an equal dimension as to define a constant clearance with the diameter B irrespective of a shaft diameter and an outer circumferential shape. The dimensions are set as described above. Accordingly, after the cup member 12a is prepared for common use and only the shaft member 13a is produced so as to have a variety of shaft diameters, lengths, and outer circumferential shapes depending on vehicle types, both the members 12a and 13a are welded to each other. Thus, it is possible to produce the outer joint member 11 adapted to various vehicle types.

Figure 6:
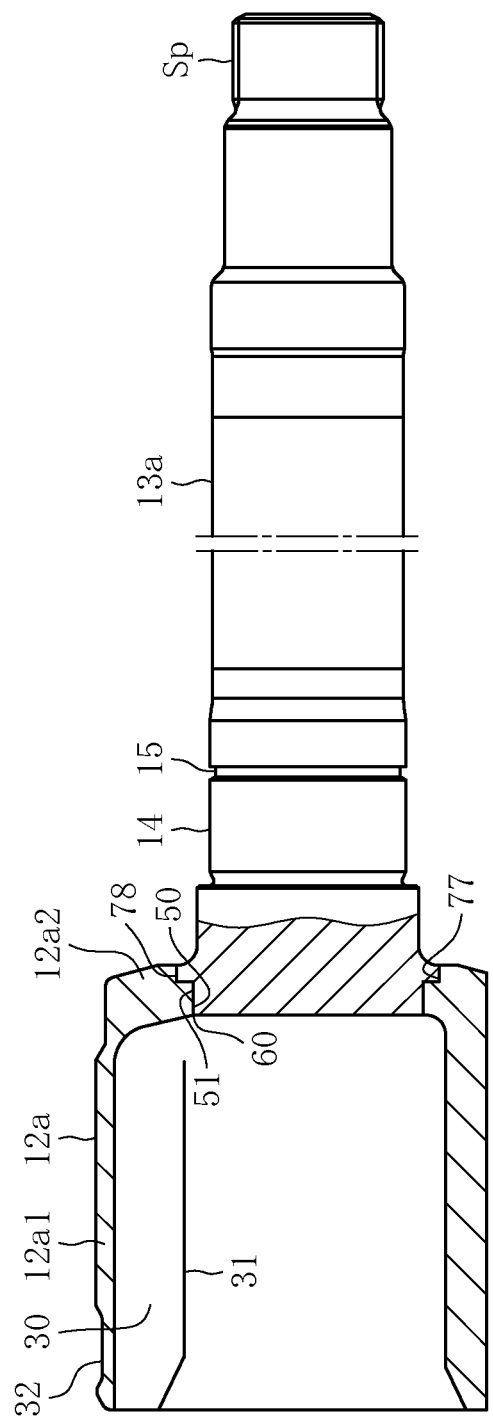
FIG. 6 is a partial vertical sectional view for illustrating a state in which the cup member and the shaft member are fitted to each other before welding.

The cup member 12a and the shaft member 13a, which are produced into the finished products in the above-mentioned manner, are press-fitted to each other as illustrated in FIG. 6. A press-fitted portion 77 of the cup member 12a and a press-fitted portion 78 of the shaft member 13a are press-fitted to each other, thereby temporarily fixing both the members 12a and 13a together in a coaxially aligned state.

Figure 7:
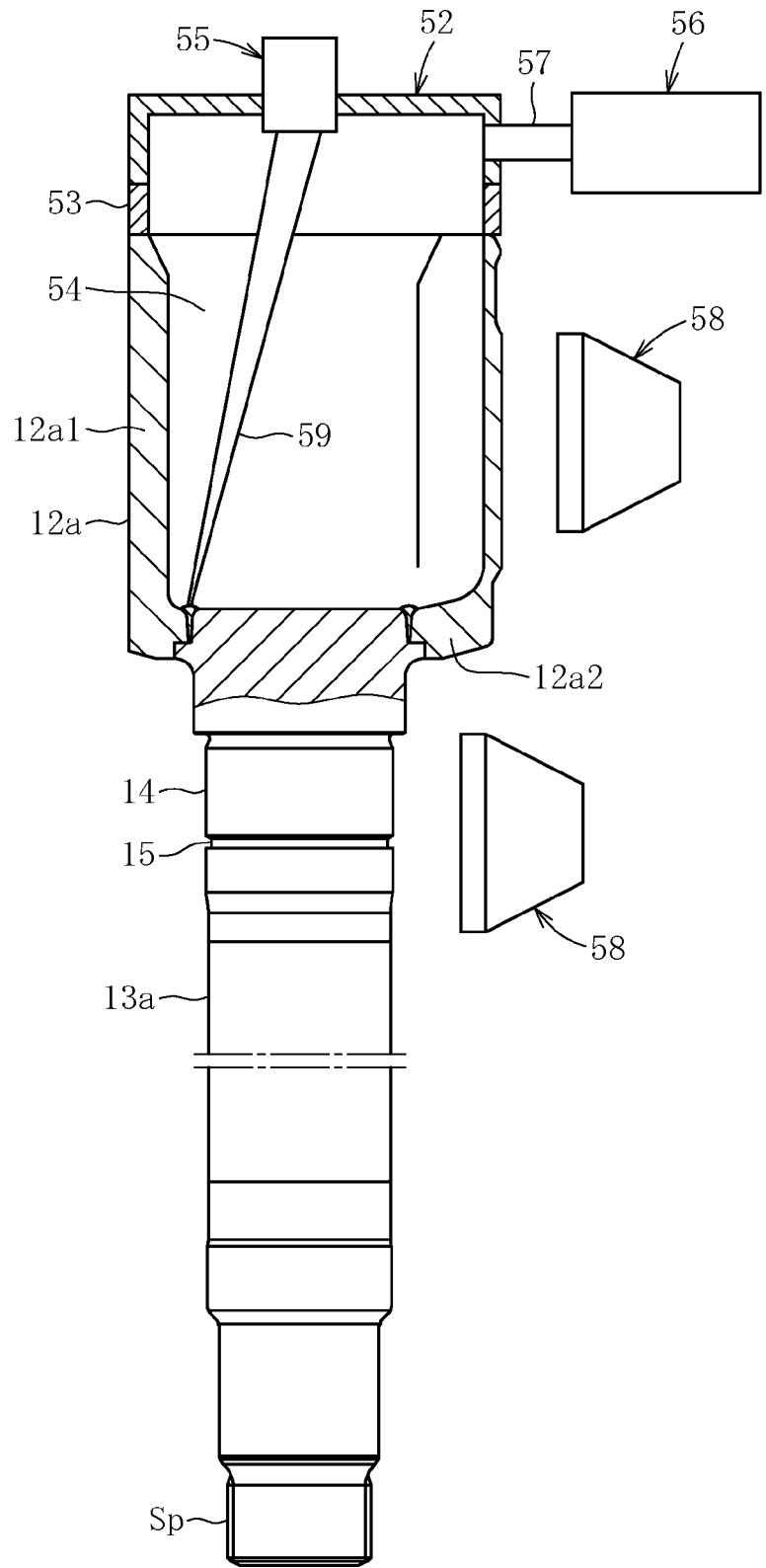
FIG. 7 is a view for illustrating an overview of a welding method in a manufacturing method according to the embodiment of the present invention.

Next, the welding step S6 of the manufacturing method according to the embodiment of the present invention is described with reference to FIG. 7. FIG. 7 is a view for illustrating an overview of the welding step S6. The cup member 12a and the shaft member 13a, which are temporarily fixed together by press-fitting, are placed in a welding apparatus (not shown). As illustrated in FIG. 7, a sealing member 53 provided on a cover member 52 is brought into abutment against an opening end portion of the cup member 12a, thereby forming a sealed space 54 in an interior of the cup member 12a. An electron gun 55 is placed on the cover member 52, and a vacuum pump 56 is connected to the cover member 52 through a duct 57 in order to evacuate the sealed space 54. Cooling jackets 58 are provided on an outer side of the outer circumferential surface of the cup member 12a and an outer side of the outer circumferential surface of the shaft member 13a, respectively.

Specifically, the sealing member 53 provided on the cover member 52 is brought into abutment against the opening end portion of the cup member 12a, and the sealed space 54 is formed in the interior of the cup member 12a. Then, pressure in the sealed space 54 is evacuated to approximately 1.3 Pa equal to or lower than atmospheric pressure. In this embodiment, the sealed space 54 is limited in the interior of the cup member 12a, thereby reducing a space capacity. Thus, a cycle time for the evacuation is reduced. Along with evacuating, a periphery including the fitting portion 60 between the joining hole 50 and the joining outer surface 51 is pre-heated to from 200° C. to 650° C. by an electron beam 59 in order to prevent occurrence of rapid cooling after welding and to prevent increased hardness of the welded portion. Pre-heating is performed while revolving the electron beam 59 at high speed with an increased beam width of the electron beam 59. After pre-heating, as illustrated in FIG. 7, welding is performed with a reduced beam width of the electron beam 59, and welding is performed while cooling the outer circumference of the tubular portion 12a1 of the cup member 12a and the outer circumference of the shaft member 13a in a vicinity of the bearing mounting surface 14 by the cooling jackets 58. Hardness of the welded portion is adjusted to from Hv 200 to Hv 500 by pre-heating. In this manner, it is possible to attain an excellent welded portion satisfying required strength, and to prevent reduction in hardness of the portion subjected to heat treatment.

As an example, description is made of the case where, in the above-mentioned welding step S6, pre-heating is performed before welding in order to adjust hardness of the welded portion. However, hardness of the welded portion may be adjusted by performing post-heating on the joining region to from 200° C. to 650° C. after welding. Further, pre-heating or post-heating may be performed using a heat source such as induction heating instead of the electron beam.

Figure 8:
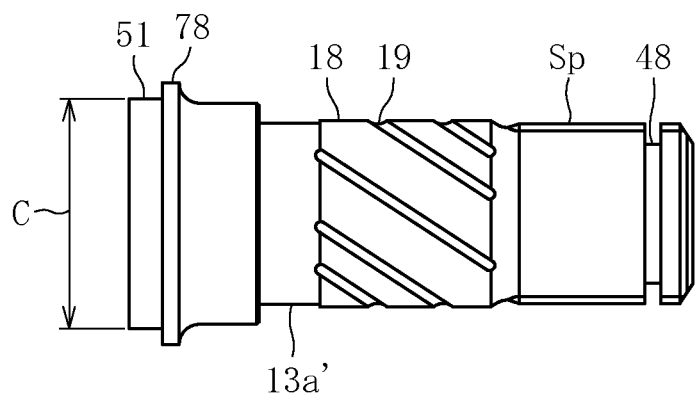
FIG. 8 is a front view for illustrating a shaft member assigned with a different product number from the shaft member of FIG. 5.
Figure 9:
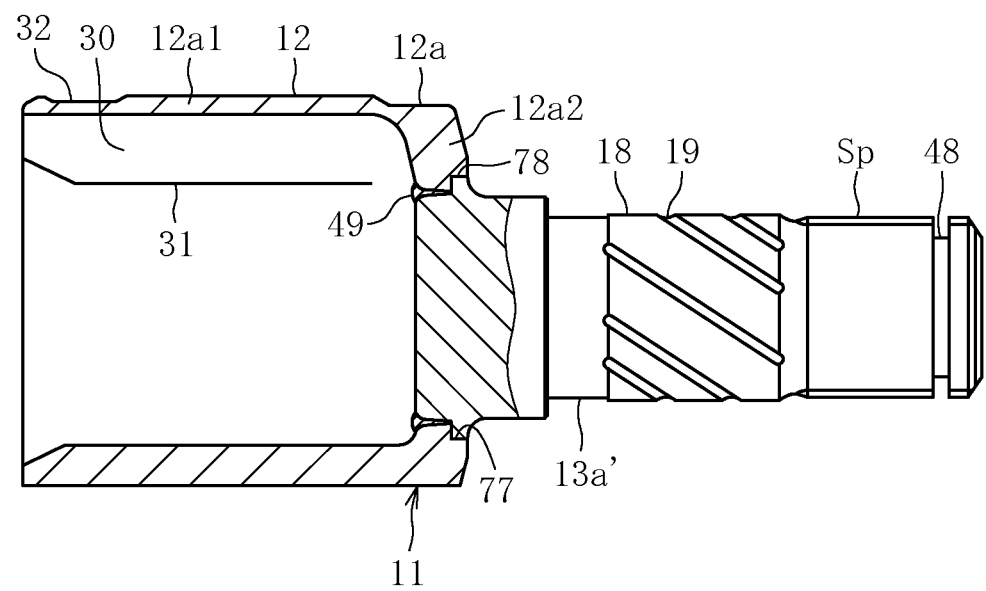
FIG. 9 is a partial vertical sectional view for illustrating an outer joint member that is manufactured using the shaft member illustrated in FIG. 8.

Next, standardization of a product type of the cup member is additionally described while exemplifying a shaft member having a product number different from that of the above-mentioned shaft member 13a of the long stem type illustrated in FIG. 5. A shaft member 13a' illustrated in FIGS. 8 and 9 is used as a general stem type on the inboard side. The shaft member 13a' has the joining outer surface 51 that is to be fitted into the joining hole 50 (see FIG. 4) of the bottom portion 12a2 of the cup member 12a. The diameter C of the joining outer surface 51 is set to the same dimension as the diameter C of the joining outer surface 51 of the shaft member 13a of the long stem type illustrated in FIG. 5.

The shaft member 13a' is used as the general stem type on the inboard side. Accordingly, the shaft member 13a' comprises a shaft section with a small length, and a sliding bearing surface 18 formed on an axial center portion thereof, and a plurality of oil grooves 19 are formed in the sliding bearing surface 18. The spline Sp and a snap ring groove 48 are formed in an end portion of the shaft member 13a' on the inboard side. As described above, even when there are differences in types, such as the general length stem type and the long stem type, and shaft diameters and outer circumferential shapes vary in each vehicle type, the diameter C of the joining outer surface 51 of the shaft member 13a or 13a' is set to an equal dimension.

The diameter B or the diameter C of the fitting portion between the joining hole 50 of the cup member 12a and the joining outer surface 51 of the shaft member 13a or 13a' is set to an equal dimension for each joint size. Thus, the cup member prepared for common use for each joint size, and the shaft member having a variety of specifications of the shaft section for each vehicle type can be prepared as finished components. Further, each of the cup member and the shaft member can be assigned with a product number for management. Even when standardizing product types of the cup member, various types of the outer joint members 11 satisfying requirements can be produced quickly through combination of the cup member and the shaft member having a variety of specifications of the shaft section for each vehicle type. Therefore, standardization of a product type of the cup member can reduce cost and alleviate a burden of production management.

Figure 10:
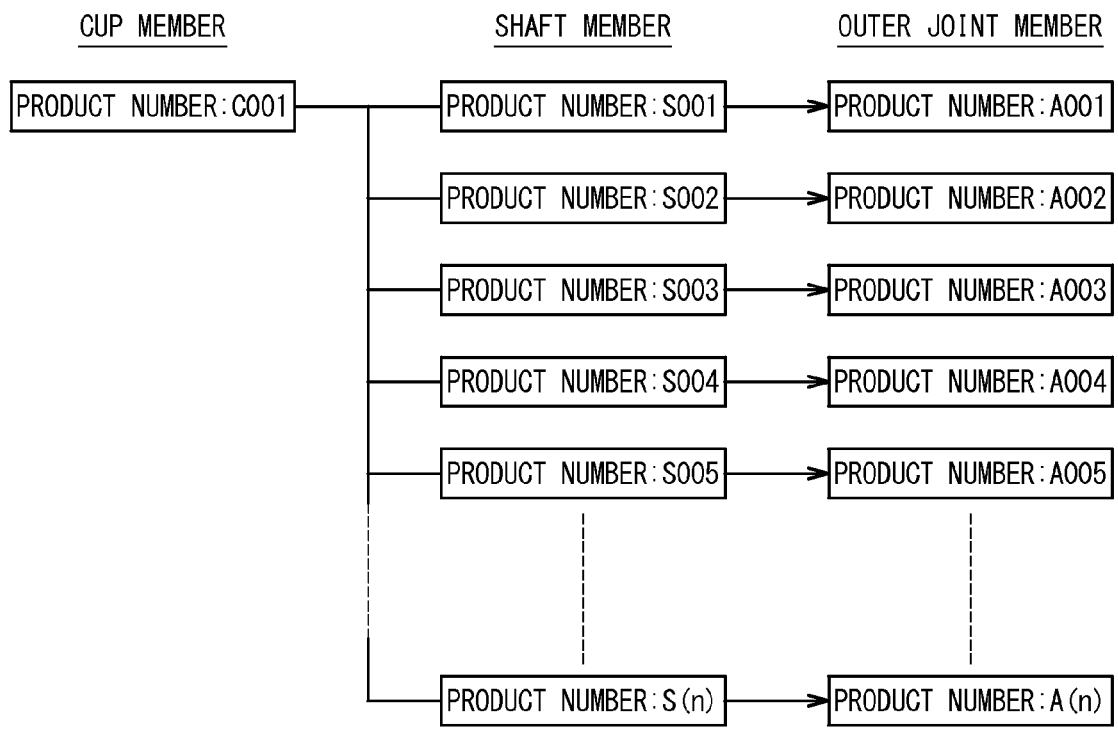
FIG. 10 is a diagram for illustrating an example of standardization of a product type of the cup member.

As a summary of the above description, FIG. 10 is a diagram for illustrating an example of standardization of a product type of the cup member. As illustrated in FIG. 10, the cup member is prepared for common use for one joint size, and is assigned with, for example, a product number C001 for management. In contrast, the shaft member has a variety of specifications of the shaft section for each vehicle type, and is assigned with, for example, a product number S001, S002, or S(n) for management. For example, when the cup member assigned with the product number C001 and the shaft member assigned with the product number S001 are combined and welded to each other, the outer joint member assigned with a product number A001 can be produced. Thus, owing to standardization of a product type of the cup member, it is possible to reduce cost and to alleviate a burden of production management. In the standardization of a product type, the cup member is not limited to one type for one joint size, that is, not limited to one type assigned with a single product number. For example, the cup member comprises cup members of a plurality of types (assigned with a plurality of product numbers, respectively) that are prepared for one joint size based on different specifications of a maximum operating angle, and are each prepared so that the diameter of the fitting portion has an equal dimension.

Figure 11:
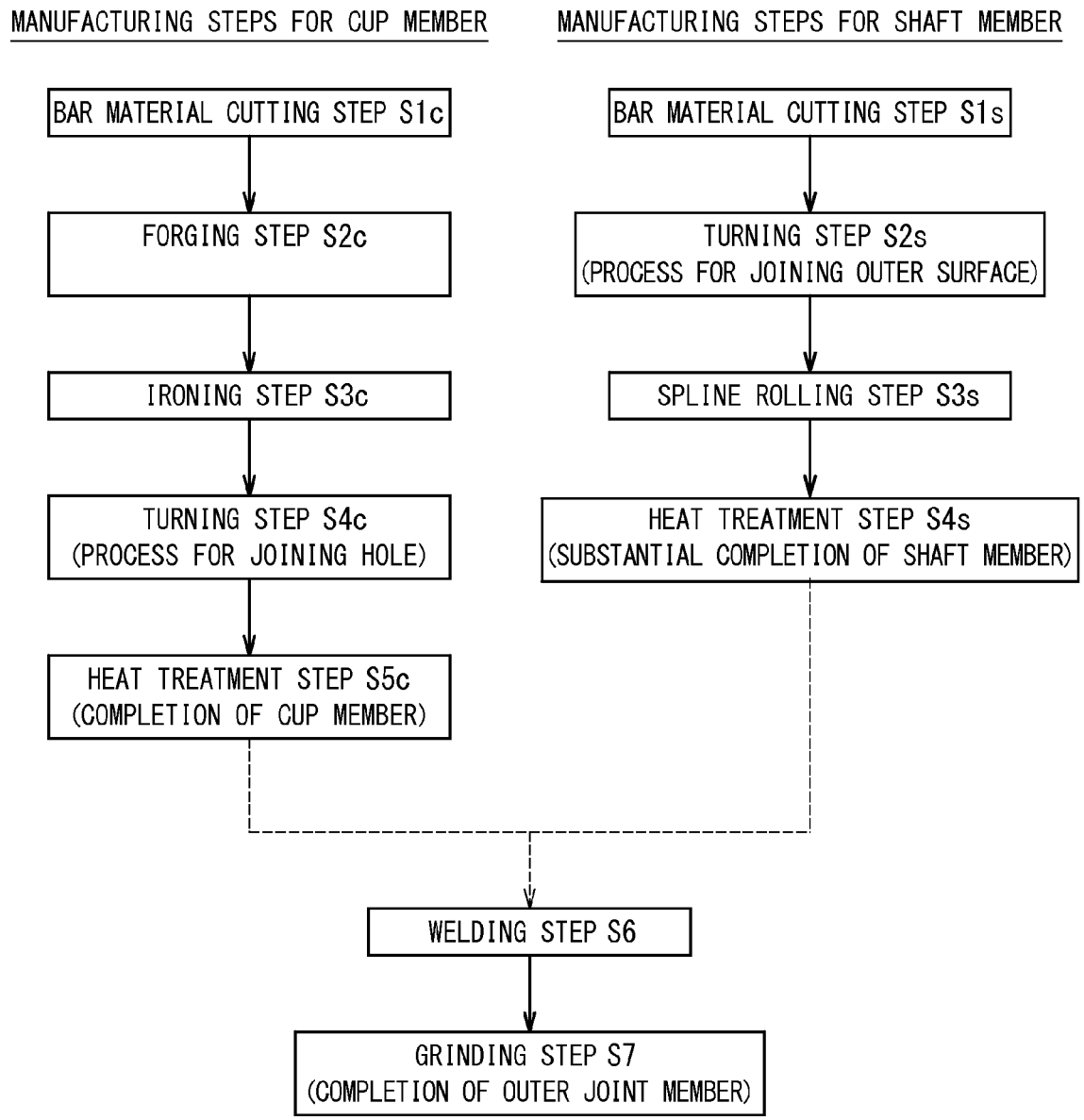
FIG. 11 is a diagram for illustrating an overview of a partially-modified example of the manufacturing steps for the outer joint member.

FIG. 11 is a diagram for illustrating an example of partially modifying the above-mentioned manufacturing steps illustrated in FIG. 3. In manufacturing steps illustrated in FIG. 11, the grinding step Sys for the shaft member illustrated in FIG. 3 is shifted after the welding step S6, and is performed as grinding step S7. In the manufacturing steps, after welding is performed on the cup member and the shaft member, the bearing mounting surface and the sliding bearing surface of the shaft member are finished by the grinding. Accordingly, in the manufacturing steps for the shaft member illustrated in FIG. 11, substantial completion of the shaft member is described in the heat treatment step S4s. The other configurations are the same as those of the manufacturing steps illustrated in FIG. 3, and hence the same processing steps are denoted by the same reference symbols to omit redundant description. Thus, in the present invention, the cup member and the shaft member as finished components are not limited to members subjected to finishing (finishing of, for example, the bearing mounting surface and the sliding bearing surface) such as the grinding performed after heat treatment or cutting work performed after quenching as in the case of the above-mentioned embodiment. The cup member and the shaft member according to the present invention encompass members assuming a state after completion of heat treatment but before being subjected to the finishing.

Next, an outer joint member according to a second embodiment of the present invention is described with reference to FIGS. 12 and 13. In this embodiment, parts that have the same function as those of the outer joint member according to the first embodiment are denoted by the same reference symbols to omit redundant description.

Figure 12:
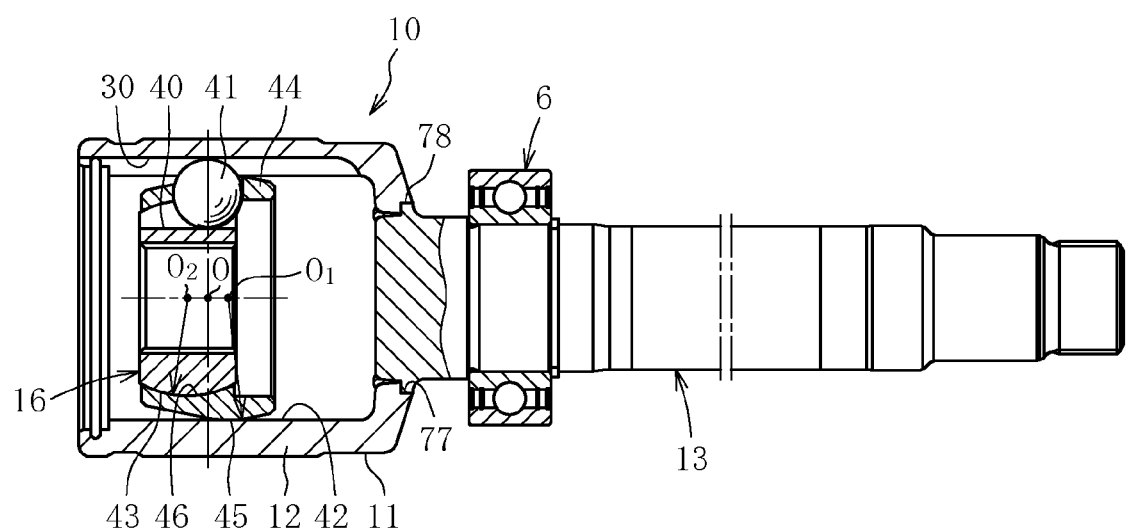
FIG. 12 is a partial vertical sectional view for illustrating a constant velocity universal joint using an outer joint member according to a second embodiment of the present invention.

A plunging type constant velocity universal joint 10 illustrated in FIG. 12 is a double offset type constant velocity universal joint (DOJ). The constant velocity universal joint 10 comprises the outer joint member 11 comprising the cup section 12 and the long stem section 13 that extends from the bottom portion of the cup section 12 in the axial direction, the inner joint member 16 housed along the inner circumference of the cup section 12 of the outer joint member 11, balls 41 serving as torque transmitting elements that are arranged between the track grooves 30 and track grooves 40 of the outer joint member 11 and the inner joint member 16, and a cage 44 for holding the balls 41 and comprising a spherical outer circumferential surface 45 and a spherical inner circumferential surface 46 that are fitted to a cylindrical inner circumferential surface 42 of the outer joint member 11 and a spherical outer circumferential surface 43 of the inner joint member 16, respectively. A center of curvature $O_1$ of the spherical outer circumferential surface 45 and a center of curvature $O_2$ of the spherical inner circumferential surface 46 of the cage 44 are offset with respect to a joint center O on axially opposite sides.

Similarly to the outer joint member according to the first embodiment, the inner race of the support bearing 6 is fixed to the outer circumferential surface of the long stem section 13, and the outer race of the support bearing 6 is fixed to the transmission case with the bracket (not shown). The outer joint member 11 is supported by the support bearing 6 in a freely rotatable manner, and thus the vibration of the outer joint member 11 at the time of driving or the like is prevented as much as possible.

Figure 13:
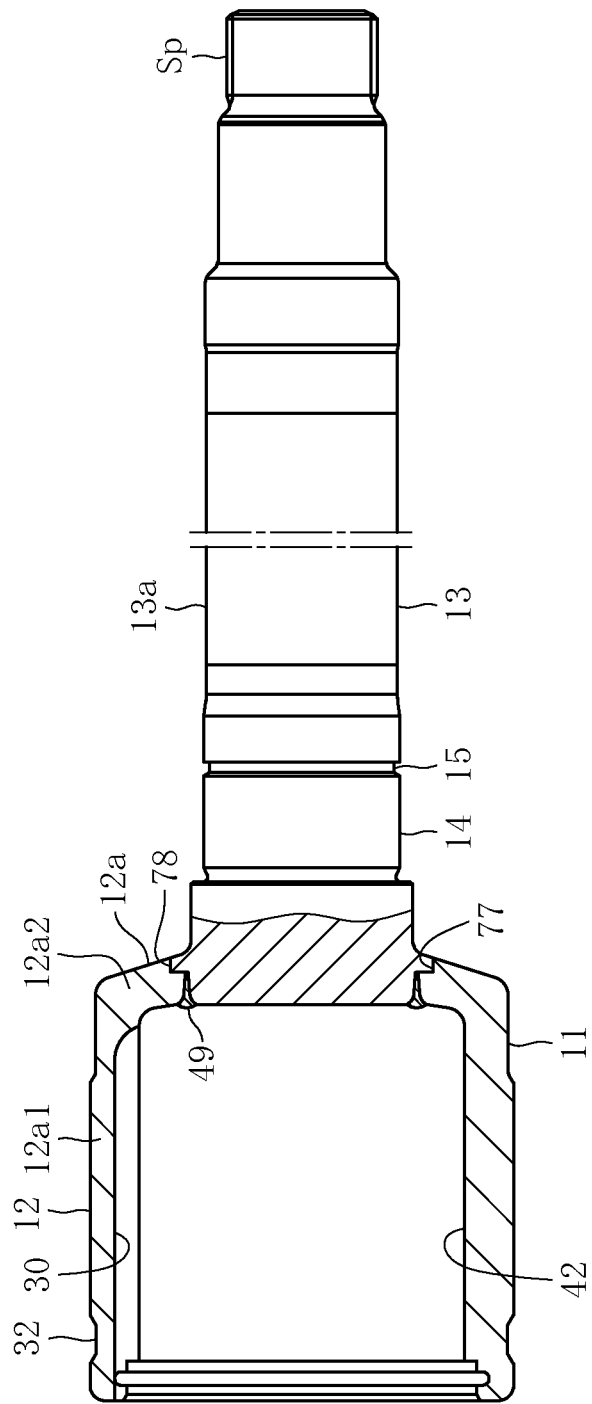
FIG. 13 is a partial vertical sectional view for illustrating the outer joint member of the FIG. 12.
Figure 14:
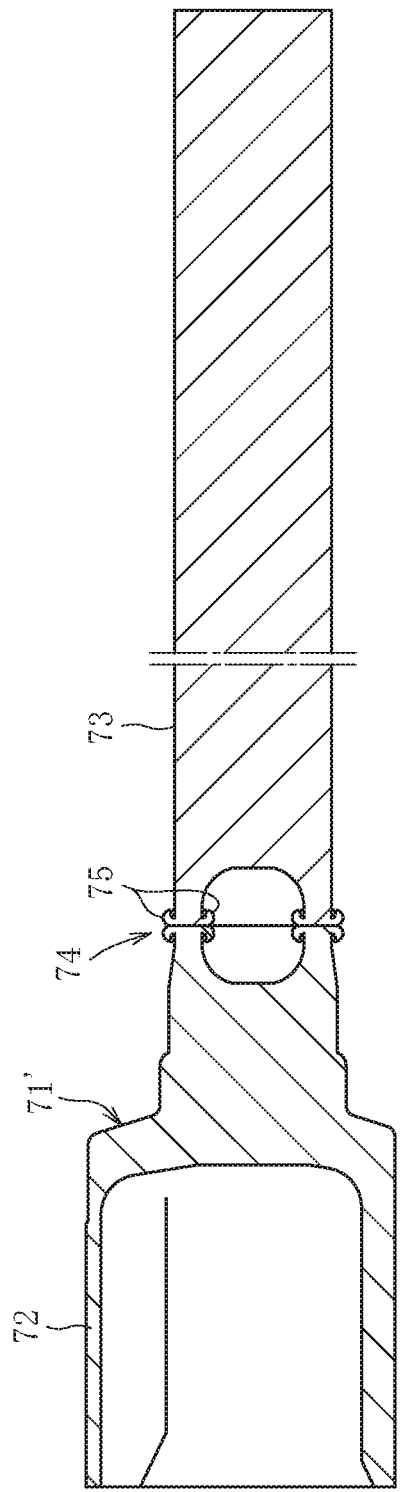
FIG. 14 is a vertical sectional view for illustrating an outer joint member according to a related art.
Figure 15:
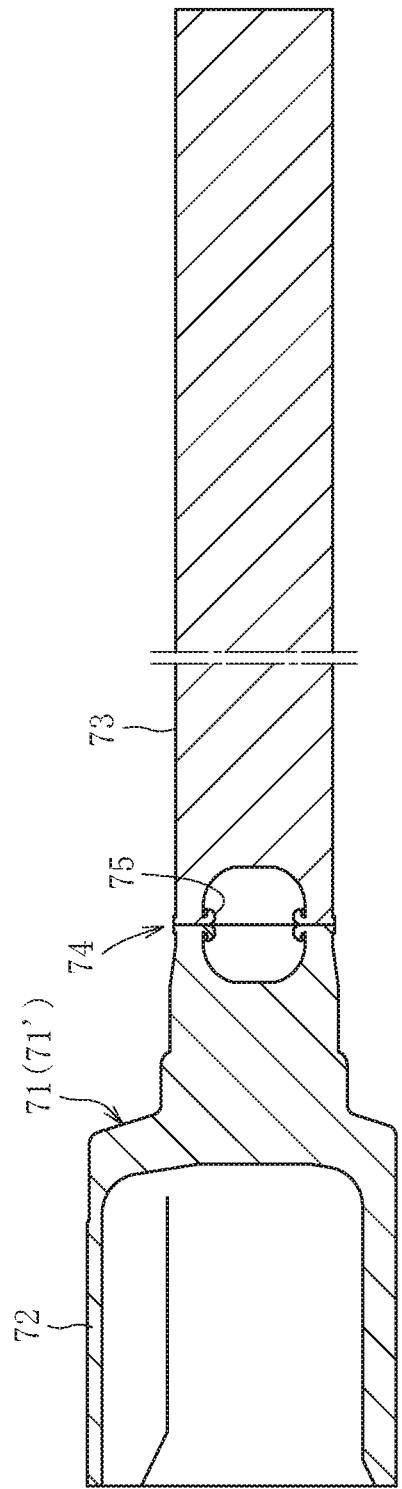
FIG. 15 is a vertical sectional view for illustrating the outer joint member according to the related art.
Figure 16:
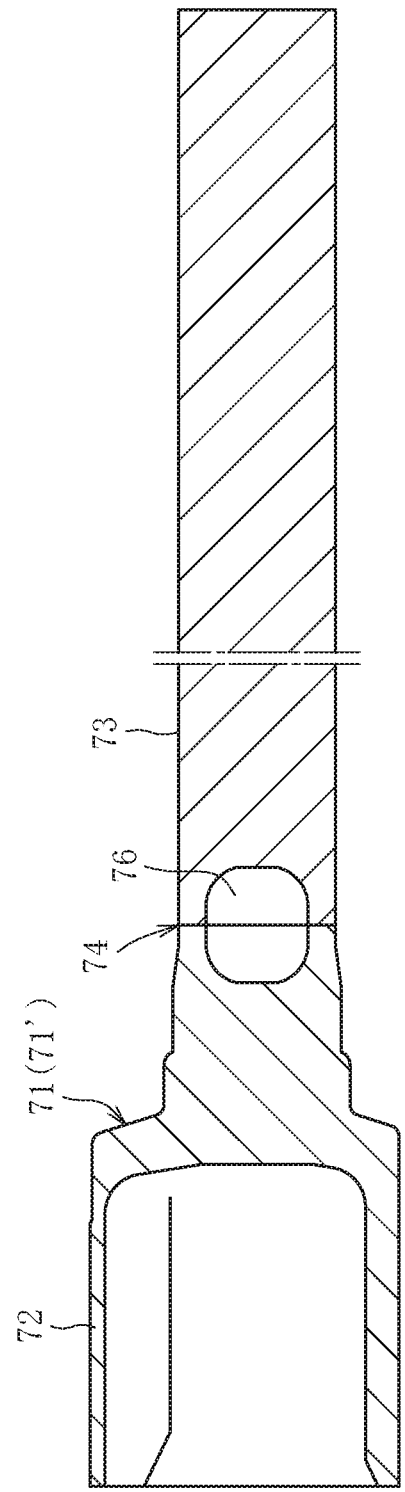
FIG. 16 is a vertical sectional view for illustrating an outer joint member according to a related art.

FIG. 13 is a partial vertical sectional view for illustrating the outer joint member 11. As in the example of FIG. 13, the outer joint member 11 comprises the bottomed cylindrical cup section 12 that is opened at one end and has six or eight track grooves 30, on which the balls 41 (see FIG. 12) are arranged, formed in the inner circumferential surface 42 thereof, and the long stem section 13 that extends from the bottom portion of the cup section 12 in the axial direction and comprises the spline Sp serving as the torque transmitting coupling portion formed at the outer diameter on the end portion thereof on the opposite side to the cup section 12 (inboard side). Similarly to the first embodiment, the outer joint member 11 is obtained by welding the cup member 12a and the shaft member 13a.

The outer joint member according to this embodiment is the same as the outer joint member according to the first embodiment, and is manufactured in the same method as the manufacturing method according to the first embodiment. Therefore, all the above-mentioned matters are applied mutatis mutandis in this embodiment to omit redundant description.

In the above-mentioned embodiments, the case to which electron beam welding is applied is described, but laser welding is also similarly applicable.

In the outer joint member according to the embodiments described above, the cases where the present invention is applied to the tripod type constant velocity universal joint as the plunging type constant velocity universal joint 10, and to the double offset type constant velocity universal joint as the plunging type constant velocity universal joint 10 are described. However, the present invention may be applied to an outer joint member of another plunging type constant velocity universal joint such as a cross-groove type constant velocity universal joint, and to an outer joint member of a fixed type constant velocity universal joint. Further, in the above, the present invention is applied to the outer joint member of the constant velocity universal joint, which is used to construct the drive shaft. However, the present invention may be applied to an outer joint member of a constant velocity universal joint, which is used to construct a propeller shaft.

The present invention is not limited to the above-mentioned embodiments. As a matter of course, various modifications can be made thereto without departing from the gist of the present invention. The scope of the present invention is defined in the claims, and encompasses equivalents described in the claims and all changes within the scope of the claims.

DESCRIPTION OF REFERENCE SIGNS 1 drive shaft
2 intermediate shaft
3 spline
4 boot
5 boot
6 support bearing
10 plunging type constant velocity universal joint
11 outer joint member
12 cup section
12a cup member
12a1 tubular portion
12a2 bottom portion
13 long shaft section
13a shaft member
14 bearing mounting surface
16 inner joint member
17 tripod member
19 torque transmitting element (roller)
20 fixed type constant velocity universal joint
21 outer joint member
22 inner joint member
23 torque transmitting element (ball)
24 cage
30 track groove
31 inner circumferential surface
40 track groove
41 torque transmitting element (ball)
49 welded portion
50 joining hole
51 joining outer surface
52 cover member
54 sealed space
55 electron gun
56 vacuum pump
58 cooling jacket
59 electron beam
60 fitting portion
77 press-fitted portion
78 press-fitted portion
B diameter
C diameter
O joint center
$O_1$ center of curvature
$O_2$ center of curvature
Sp spline

The invention claimed is:

1. A method for manufacturing a plurality of outer joint members for a plurality of constant velocity universal joints which vary in joint type and joint size, each of the outer joint members comprising a cup section having track grooves, which engage with torque transmitting elements, formed in an inner circumference thereof, and a shaft section formed at a bottom portion of the cup section, wherein a shaft member constituting the shaft section is welded to a cup member constituting the cup section, the cup member and the shaft member being formed of medium carbon steel, the method comprising, for each of the outer joint members:
integrally forming a tubular portion and the bottom portion of the cup member by forging;
performing a machining step and a heat treatment step on the cup member to prepare the cup member as a finished component,
the machining step for the cup member comprising forming a joining hole at the bottom portion of the cup member;
performing a machining step and a heat treatment step on the shaft member to prepare the shaft member as a finished component,
the machining step for the shaft member comprising forming a joining outer surface on an end portion of the shaft member to be joined to the bottom portion of the cup member, wherein the shaft member is one of a plurality of shaft members prepared with respect to the cup member, each of the shaft members having a particular specification depending on a type of a vehicle in which the shaft member is to be assembled;
fitting the joining hole of the cup member as the finished component and the joining outer surface of one shaft member selected from the plurality of shaft members as the finished component to each other; and
welding a fitting portion between the joining hole of the cup member and the joining outer surface of the one shaft member selected from the plurality of shaft members through irradiation of a beam from an inner side of the cup member,
wherein a diameter of the joining hole of the cup member of each of the outer joint members and a diameter of the joining outer surface of each of the shaft members of each of the outer joint members are set so that diameters of the fitting portions between the cup members and the corresponding shaft members are equal to each other among the outer joint members for the constant velocity universal joints having the same joint size, irrespective of the joint type and the particular specification of the shaft member.

2. The method for manufacturing the plurality of outer joint members for the plurality of constant velocity universal joints which vary in joint type and joint size according to claim 1, further comprising, before the welding, finishing at least one of the cup member and the shaft member after heat treatment.

3. The method for manufacturing the plurality of outer joint members for the plurality of constant velocity universal joints which vary in joint type and joint size according to claim 2, wherein the welding comprises electron beam welding.

4. The method for manufacturing the plurality of outer joint members for the plurality of constant velocity universal joints which vary in joint type and joint size according to claim 2, wherein the welding is performed under a state in which pressure of an interior of the cup section is equal to or lower than atmospheric pressure.

5. The method for manufacturing the plurality of outer joint members for the plurality of constant velocity universal joints which vary in joint type and joint size according to claim 2, wherein the welding is performed while cooling the cup section and the shaft section.

6. The method for manufacturing the plurality of outer joint members for the plurality of constant velocity universal joints which vary in joint type and joint size according to claim 2, further comprising pre-heating a joining region between the cup member and the shaft member to 200° C. to 650° C. before the welding.

7. The method for manufacturing the plurality of outer joint members for the plurality of constant velocity universal joints which vary in joint type and joint size according to claim 2, further comprising post-heating a joining region between the cup member and the shaft member to from 200° C. to 650° C. after the welding.

8. The method for manufacturing the plurality of outer joint members for the plurality of constant velocity universal joints which vary in joint type and joint size according to claim 2, wherein hardness of a welded portion between the cup member and the shaft member ranges from Hv 200 to Hv 500.

9. The method for manufacturing the plurality of outer joint members for the plurality of constant velocity universal joints which vary in joint type and joint size according to claim 1, wherein the welding comprises electron beam welding.

10. The method for manufacturing the plurality of outer joint members for the plurality of constant velocity universal joints which vary in joint type and joint size according to claim 1, wherein the welding is performed under a state in which pressure of an interior of the cup section is equal to or lower than atmospheric pressure.

11. The method for manufacturing the plurality of outer joint members for the plurality of constant velocity universal joints which vary in joint type and joint size according to claim 1, wherein the welding is performed while cooling the cup section and the shaft section.

12. The method for manufacturing the plurality of outer joint members for the plurality of constant velocity universal joints which vary in joint type and joint size according to claim 1, further comprising pre-heating a joining region between the cup member and the shaft member to 200° C. to 650° C. before the welding.

13. The method for manufacturing the plurality of outer joint members for the plurality of constant velocity universal joints which vary in joint type and joint size according to claim 1, further comprising post-heating a joining region between the cup member and the shaft member to 200° C. to 650° C. after the welding.

14. The method for manufacturing the plurality of outer joint members for the plurality of constant velocity universal joints which vary in joint type and joint size according to claim 1, wherein hardness of a welded portion between the cup member and the shaft member ranges from Hv 200 to Hv 500.

* * * * *